(12) United States Patent
Karnes

(10) Patent No.: US 6,196,597 B1
(45) Date of Patent: Mar. 6, 2001

(54) HEATING DUCT

(76) Inventor: James A. Karnes, 450 W. 29th St., Erie, PA (US) 16508

( * ) Notice: Subject to any disclaimer, the term of this patent is extended or adjusted under 35 U.S.C. 154(b) by 0 days.

(21) Appl. No.: 09/250,498

(22) Filed: Feb. 16, 1999

(51) Int. Cl.⁷ ................................................ F16L 25/00
(52) U.S. Cl. ...................................... 285/331; 285/748.22
(58) Field of Search ................................. 285/64, 3, 93, 285/331, 148.22, 901, 148.19, 130.1, 131.1, 424, 133.3, 133.11

(56) References Cited

U.S. PATENT DOCUMENTS

| | | | |
|---|---|---|---|
| 1,969,588 | * | 8/1934 | Sweet ................................. 285/131.1 |
| 3,920,271 | * | 11/1975 | Bluestone ........................ 285/148.22 |
| 4,819,972 | * | 4/1989 | Champa et al. ...................... 285/331 |
| 5,522,229 | * | 6/1996 | Stuchlik, III et al. .................. 62/127 |
| 5,590,477 | * | 1/1997 | Carfagno, Sr. ........................ 285/424 |
| 5,819,326 | * | 10/1998 | Kobayashi et al. ............. 285/148.22 |

* cited by examiner

Primary Examiner—Lynne H. Browne
Assistant Examiner—Aaron M Dunwoody
(74) Attorney, Agent, or Firm—Richard K. Thomson

(57) ABSTRACT

A plastic duct section is equipped with integral connections on its ends. Each duct has indicia along its running length to facilitate cutting of the duct to a desired length. In one embodiment, the indicia may take the form of equally spaced circumferential ribs spaced along the length of the duct. These ribs are engaged by sets of fingers extending toward each other from concentric walls spaced to receive the straight end of an adjacent duct section. The innermost end of the concentric walls is equipped with a layer of insulative material to enable sealing engagement between duct sections significantly reducing pressure loss. Attached straps permit duct sections to be easily suspended between adjacent joists. A floor-mounted elbow boot is equipped with a removable plastic cover to prevent dust, dirt and debris from accumulating in the installed heating duct during finish construction of the building.

20 Claims, 2 Drawing Sheets

HEATING DUCT

The present invention is directed to heating, ventilating, and air conditioning (HVAC) ducts. More particularly, the present invention is directed to improvements in HVAC ducts that will permit them to more easily be cut to a particular length and to allow one section of duct to be quickly and easily assembled to an adjacent section.

BACKGROUND AND SUMMARY OF THE INVENTION

Present day HVAC ducts suffer from a number of disadvantages. First, sections of duct are not easily connected one to another generally requiring the installation of as many as 8 screws around the periphery of the joined ducts at each joint. This is laborious and time consuming. Second, it is a problem to cut a section to a particular length, whether the duct section is rectangular or round, the duct must be measured and then a circumferential line drawn at the length desired so the tin snips have a guide to follow. Third, the cut edges are sharp and pose a significant risk to anyone handling the cut duct.

Fourth, most HVAC ducts experience significant amounts of leakage at the joints resulting in pressure drops at the vents. One conventional means of reducing leakage at the joints is to increase the lengths of the duct, thereby reducing the number of joints. This makes handling the duct more difficult. Another means to cope with leakage is to tape the joints using a tape and/or messy mastic. Fifth, most HVAC ducts are difficult to suspend or mount between joists since they lack any integral connecting means. Sixth, most ducts are made of sheet metal. It is estimated that losses in heating efficiency can be as high as 60% due to convective and radiative heating of the typically uninsulated air space surrounding the duct. Sheet metal ducts also pose a significant hazard to handlers, particularly when a burred or sharp edge has been created due to cutting to length.

Finally, in new construction, the use of floor-mounted boots can often cause problems since any dust and debris can fall into the grate and remain lodged in the duct. When the furnace is activated, the dust and small debris particles become airborne which becomes a nuisance to the home owner and frequently results in a service call for the HVAC supplier to identify the source of the objectionable odor.

It is among the objects of the present invention to overcome the deficiencies of the prior art HVAC ducts. The HVAC duct of the present invention is equipped with a quick connector for adjacent sections. This connector has opposing cylindrical surfaces equipped with inwardly protruding fingers which form a "chinese finger puzzle" gripper which can engage an end of another section of duct. Preferably, a separate connector may be equipped with two grippers, one on either end, to interconnect two sections of duct. Alternatively, each section of duct may have a connector integrally formed on a first end of the duct for engagement of an opposing end of the adjacent duct section.

The entire length of the duct of the present invention may have spaced there along at equal distances a series of peripheral ribs. These ribs serve to provide structural rigidity as well as enable cutting to particular length. The ribs provide a guide to the shears to enable more precise circumferential cutting to length. In addition, at least two circumferential ribs are engaged by the gripping fingers to ensure interconnection of the duct sections. Alternatively, indicia may be provided on the surface of the duct to provide the ready measurement feature if the gripping fingers provide adequate retention force without the ribs. Each recess is lined with a layer of insulative foam, such as foam rubber, or other insulative material, so that the received end of the duct seals in the material. The insulative foam results in retention of as much as 90% of the pressure at the duct inlet arriving at the outlet.

Each duct section is equipped with two eared circumferential bands which permit easy securement between floor or wall joists. The duct system of the present invention further includes a floor-mounted elbow boot which is equipped with a removable plastic cover which permits the duct to be protected from dirt, dust and debris settling into the vent before construction is complete.

While the duct of the present invention can be made of sheet metal, it is most preferably manufactured of plastic. Plastic is not as aggressive a conductor of heat as metal and hence, does not rob the system of as much heat through conductive, convective and radiative heat losses. Further, the cut edge of the plastic duct does not pose as significant a threat to its handler as the sheet metal duct.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
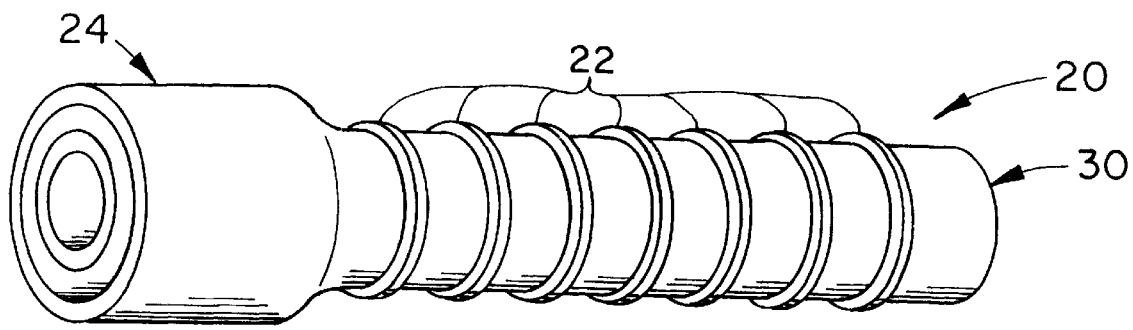
FIG. 1 is a perspective view of a first embodiment of the HVAC duct of the present invention.

A first preferred embodiment of the improved duct section of the present invention is depicted in FIG. 1 generally at 20. Duct 20 has indicia which may take the form of ribs 22 positioned along its running length. Ribs 22 could be spaced by any fixed length but it is preferred that ribs 22 be spaced a distance of one inch. These ribs serve four purposes: first they provide structural reinforcement; second, they serve as a guide for cutting duct 20; third, the ribs play a role in securing adjacent duct sections together; and, lastly, prior to cutting, a particular length can be determined by counting ribs. In the preferred embodiment, indicia will be provided on the exterior of the duct for each twelfth rib to denote footage so that counting need actually only be done between the indicia. While the duct 22 of the present invention could be made of metal it is preferably made of molded plastic. Ribs 20 may be particularly important for providing structural rigidity in this plastic embodiment. Shears can be used to make a circumferential cut on either side of rib 22. Straight circumferential cuts will afford better engagement between adjacent duct sections 20 effecting a better seal. Further, the cut edge will not pose as large a threat to the installer as a sheet metal edge. Finally, the plastic is not as good a conductor of heat which will result in significant reduction in heat lost to conductive, convective and radiative heat losses which are associated with sheet metal ducts.

In the first preferred embodiment, one end 24 of each duct has a dual concentric cylinder having first inner tubular section 26i and second outer tubular section 26o. Inner tubular section 26i has outwardly extending fingers 28i and second outer tubular section 26o has inwardly extending fingers 28o. Fingers 28i and 28o preferably overlap to increase engagement with ribs 22 of an adjacent duct section. Regardless of the actual spacing of the ribs 22, in the preferred embodiment, connector end 24 will engage a minimum of two ribs to ensure positive retention of one end 30 of duct section 20 in end 24 of an adjacent section. Inner and outer fingers 28i and 28o may be continuous annular ribs or a series of individual fingers. These overlapping fingers 28i and 28o function like a chinese finger puzzle engaging a minimum of two ribs 22 on end 30 restricting its withdrawal from dual concentric cylindrical end 24. If the fingers 28i and 28o can be designed to provide adequate gripping force, ribs 22 can be replaced by indicia which provide the information regarding length and the cost of molding the ribs into the surface can be eliminated.

A layer of insulative material 34 positioned adjacent the junction 32 of tubular sections 26i and 26o. This material 34 may be foam rubber, rubber gasketing or other insulative material which, when engaged by entrapped end 30, will seal two adjacent sections 20 against air leakage. This will significantly reduce pressure loss between adjacent duct sections without the need to make sections 20 burdensomely long.

Figure 3A:
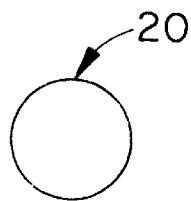
FIG. 3A is a first cross section of the duct of the present invention.
Figure 3B:
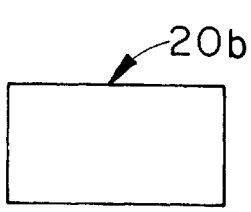
FIG. 3B is a second cross section of the duct of the present invention.
Figure 3C:
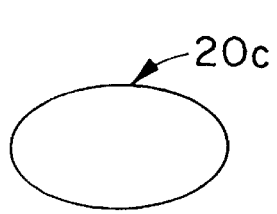
FIG. 3C is a third cross section of the duct of the present invention.
Figure 3D:
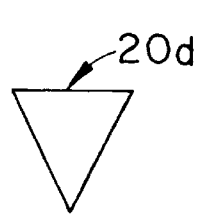
FIG. 3D is a fourth cross section of the duct of the present invention.

While the duct has been depicted as having a generally round cross (20A) section in FIG. 3A, it will be understood that the duct may also be rectangular (20B), oval (20C) or triangular (20D) in cross section, without departing from the teachings of this invention.

Two straps 36 (one shown), which may be fabric but are preferably plastic, are wrapped around the periphery of duct section 20 adjacent each end. Each strap has two ears 38 and 40 extending laterally outwardly. Straps 36 are preferably large enough around to permit sliding past ribs 22 such that when a section is cut, a strap can be relocated on the portion to be used. By simply nailing or stapling ears 38 and 40 to adjacent joists, duct section can be securely suspended in place.

Figure 4:
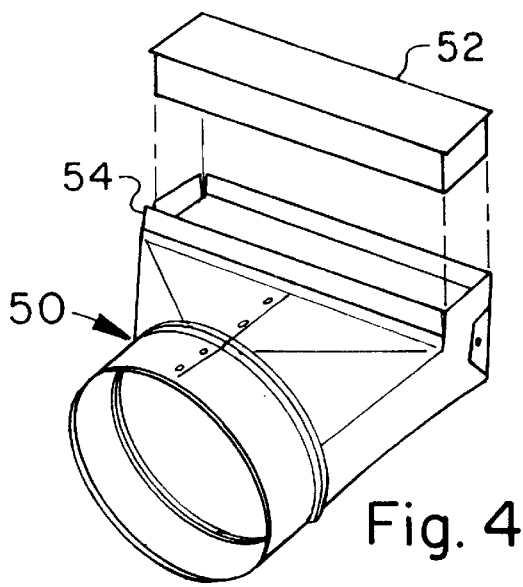
FIG. 4 is a perspective view of the floor grate with attached cover of the present invention.

FIG. 4 depicts a floor-mounted elbow boot 50 of the present invention. Boot 50 is provided with a rigid plastic cover 52 which snaps inside its upper periphery 54. The primary purpose of cover 52 is to prevent dust, dirt and debris from accumulating in heating duct 20 during the post-installation construction phase. Such accumulation can give rise to unnecessary service calls from the homeowners complaining about air borne odors from the HVAC as the dust is caught up by the air flow and blown into the household.

Figure 2:
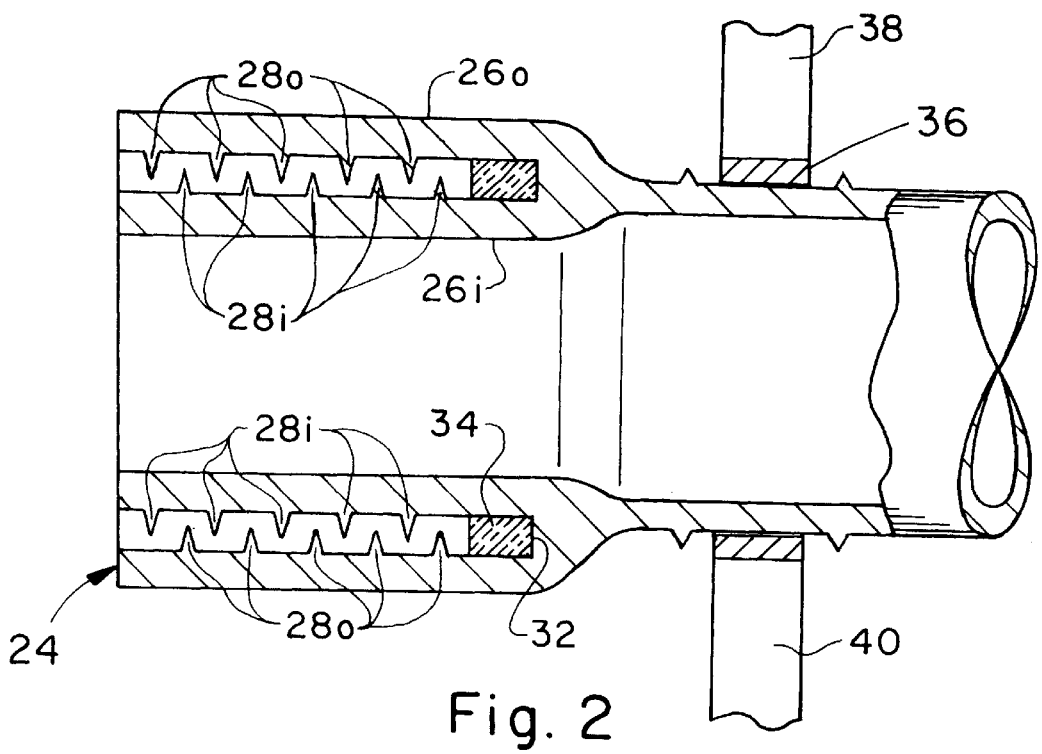
FIG. 2 is a cross-sectional side view of the end connector of the present invention.
Figure 5A:
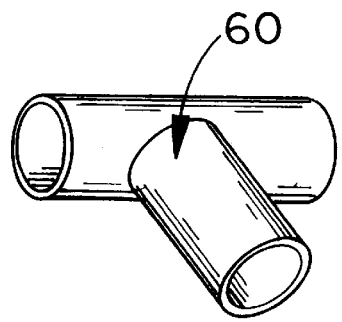
FIG. 5A is a schematic depiction of a separate connector configured as a tee.
Figure 5B:
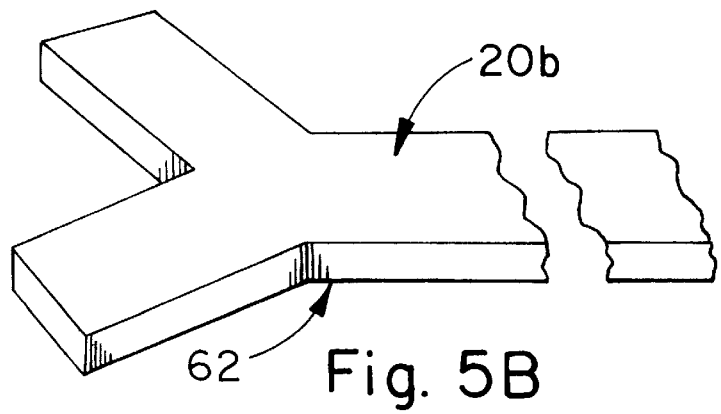
FIG. 5B is a schematic depiction of a separate connector configured as a wye.
Figure 5C:
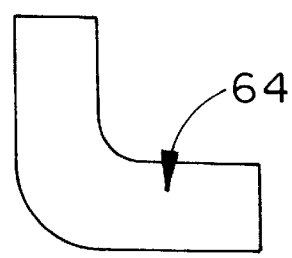
FIG. 5C is a schematic depiction of a separate connector configured as a 90° elbow.
Figure 5D:
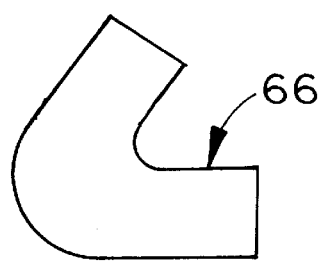
FIG. 5D is a schematic depiction of a separate connector configured as a 45° elbow; and, FIG. 6 is a schematic depiction of a two ended connector.
Figure 6:
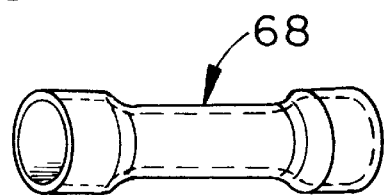

The duct system 20 of the present invention will have specialized duct sections provided to fit specialized needs. By way of example and not limitation, such specialized sections could include a tee 60 (FIG. 5A), a wye 62 (FIG. 5B), an 90° elbow 64 (FIG. 5C), and a 45° elbow 66 (FIG. 5D). For ease of manufacture, these specialty sections will preferably be molded with two straight ends and will be engaged by the connector ends 24 of adjoining duct sections 20. Alternatively, specialty sections could be formed with two connector ends 24 or with one of each, the same as the ducts 20. An alternative could be to manufacture all duct sections and specialty sections with straight ends 30 only. Then individual connector sections 68 (FIG. 6) could be used to make connection. Each connector section 68 would have a double ended chinese finger puzzle configuration (i.e., a mirrored FIG. 2 on the oppose end, each attachment end 24 having a 4 inch length with a 4 inch base diameter in between resulting a 1 foot section length). This may provide a significant cost benefit by permitting continuous extrusion of the duct which is simply cut into sections 20 allowing the creation of gripping fingers 28i and 28o to be done only in specialty connector section 68.

The duct 20 of the present invention is light weight, a better insulator, and equipped with integral connector end 24 which quickly, easily and reliably connects to an adjacent straight end 30 of an adjoining duct section. The insulative material 34 in the bottom of the connector end 24 provides a seal with engaged end 30 which significantly reduces leakage.

An additional aspect of the invention is the provision of a floor-mounted elbow boot 50 which is provided with a plastic cover 52 that inhibits the introduction of dust, dirt and debris during the construction phase which follows the installation of the HVAC duct.

Various changes, alternatives and modifications will become apparent to one of ordinary skill in the art following a reading of the foregoing. It is intended that any such changes, alternatives and modifications as fall within the scope of the appended claims be considered part of the present invention.

I claim:

1. A heating, ventilating and air conditioning (HVAC) duct comprising:

a) a section of hollow duct having a first lateral geometric cross section and indicia of length provided along an outer surface portion of said hollow duct for facilitating cutting of said duct to a particular length, b) a connector for engaging a first end of said section of hollow duct having a second lateral geometric cross section identical to said first lateral geometric cross section and a first outer portion which has a C-shaped axial cross section formed by first, second and third inwardly directed surfaces, said first and third surfaces extending generally parallel to each other forming opposing parallel surfaces and said second surface interconnecting said first and third surfaces, a plurality of gripping fingers extending inwardly from each of said first and third surfaces toward said opposing parallel surface, said gripping fingers including a first group extending inwardly from said first surface toward said third surface and a second group extending inwardly from said third surface toward said first surface said first and second groups of fingers overlapping one another;

whereby a first section of hollow duct may be connected to a second section of hollow duct by inserting said first end thereof into said connector having said C-shaped axial cross section, said inwardly extending fingers of said connector engaging inner and outer surfaces of said first section and restricting removal of said first end from said connector.

2. The HVAC duct of claim 1 wherein said indicia include markings provided for each foot of length of said duct.

3. The HVAC duct of claim 2 wherein said indicia further comprises a series of peripheral ribs uniformly spaced along an external surface of said hollow duct by a first distance, said ribs providing said indicia and increasing an effectiveness of said connector.

4. The HVAC duct of claim 3 wherein said peripheral ribs are spaced from one another by a length of about 1 inch.

5. The HVAC of claim 1 wherein said first geometric cross section is selected from a group consisting of round, rectangular, square and oval.

6. The HVAC of claim 1 wherein said connector is formed integrally with a second end of said section of hollow duct.

7. The HVAC of claim 6 further comprising a quantity of sealing material extending between said first and third surfaces adjacent said second surface for engaging said first end of said hollow duct to seal said first end in said connector and reduce loss of pressure from said duct.

8. The HVAC of claim 7 wherein said sealing material comprises a compressible insulative foam.

9. The HVAC of claim 1 wherein said connector further comprises a second outer portion extending in a direction generally opposite to said first portion and having a C-shaped axial cross section formed by fourth and sixth surfaces said fourth and sixth surfaces extending generally parallel to each other and said fifth surface interconnecting said fourth and sixth surfaces, and at least one of said fourth and sixth surfaces having a plurality of gripping fingers extending inwardly toward the opposing parallel surface for engaging at least two ribs of a first end of a third section of hollow duct.

10. The HVAC of claim 9 further comprising a first quantity of sealing material extending between said first and third surfaces adjacent said second surface and a second quantity of sealing material extending between said fourth and said sixth surfaces adjacent said fifth surface, said first and second quantities of sealing material engaging first ends of a first and second section of hollow duct, respectively, to seal said first ends in said connector and reduce loss of pressure from said duct.

11. The HVAC of claim 9 wherein said connector is configured as a straight section with said first and second outer portions extending in opposed directions.

12. The HVAC of claim 9 wherein said connector is configured as a 90° elbow.

13. The HVAC of claim 9 wherein said connector is configured as a 45° elbow.

14. The HVAC of claim 9 wherein said connector is configured as a wye connector to enable connection of a single section of hollow duct simultaneously to two additional sections of hollow duct which diverge.

15. The HVAC of claim 9 wherein said connector is configured as a tee connector to enable connection of a single section of hollow duct simultaneously to two additional sections of duct directed in opposed directions.

16. The HVAC of claim 1 said connector further comprising a pair of straps extending laterally outwardly permitting attachment of said hollow duct to a joint.

17. The HVAC of claim 1 further comprising a floor-mounted elbow boot for said hollow duct, said floor-mounted elbow boot having a removable cover attached thereto, said removable cover preventing dust and debris from entering said hollow duct during initial housing construction.

18. The HVAC of claim 1 wherein said hollow duct and said connector are made of material selected from the group consisting of metal and plastic.

19. A heating, ventilating and air conditioning (HVAC) duct for use in residential and commercial applications said HVAC duct comprising a plurality of inconnectable sections including a floor-mounted elbow boot for said HVAC duct, said floor-mounted elbow boot having a removable cover attached thereto, said removable cover preventing dust and debris from entering said HVAC duct during initial building construction and being removed for preparing said elbow boot for normal usage once construction has been completed.

20. The HVAC duct of claim 19 further comprising a distal end of said elbow boot having a first geometric cross section and having a connector for engaging a first end of a section of HVAC duct which has a second lateral geometric cross section identical to said first lateral geometric cross section, said connector having a first outer portion which has a C-shaped axial cross section formed by first, second and third inwardly directed surfaces, said first and third surfaces extending generally parallel to each other forming opposing parallel surfaces and said second surface interconnecting said first and third surfaces, a plurality of gripping fingers extending inwardly from each of said first and third surfaces toward said opposing parallel surface, said gripping fingers including a first group extending inwardly from said first surface toward said third surface and a second group extending inwardly from said third surface toward said first surface said first and second groups of fingers overlapping one another; whereby said elbow boot may be connected to a first section of HVAC duct by inserting said first end of said HVAC duct into said connector of said elbow boot which has said C-shaped axial cross section, said inwardly extending fingers restricting removal of said first end from said connector.

* * * * *